United States Patent
Takeuchi et al.

(10) Patent No.: US 8,320,101 B2
(45) Date of Patent: Nov. 27, 2012

(54) MULTILAYER ELECTRONIC COMPONENT AND METHOD FOR MANUFACTURING THE SAME

(75) Inventors: Shunsuke Takeuchi, Echizen (JP); Kenichi Kawasaki, Echizen (JP); Akihiro Motoki, Fukui (JP); Makoto Ogawa, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 281 days.

(21) Appl. No.: 12/817,352

(22) Filed: Jun. 17, 2010

(65) Prior Publication Data

US 2010/0328842 A1   Dec. 30, 2010

(30) Foreign Application Priority Data

Jun. 26, 2009 (JP) ................. 2009-151730

(51) Int. Cl.
    *H01G 4/228*       (2006.01)
(52) U.S. Cl. .................... 361/306.3; 29/25.42
(58) Field of Classification Search .............. 361/306.1, 361/309, 306.3; 29/25.03, 25.42
    See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 8,014,123 B2 * | 9/2011 | Kayatani et al. | 361/306.3 |
| 8,077,445 B2 * | 12/2011 | Iwanaga et al. | 361/309 |
| 8,094,432 B2 * | 1/2012 | Motoki et al. | 361/321.2 |
| 8,125,763 B2 * | 2/2012 | Kobayashi et al. | 361/309 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2008/0210564 A1 | 9/2008 | Motoki et al. | |

FOREIGN PATENT DOCUMENTS

JP   63-169014 A     7/1988
WO   2008/059666 A1  5/2008

OTHER PUBLICATIONS

Official Communication issued in corresponding Chinese Patent Application No. 201010214569, mailed on Aug. 29, 2011.
Saruban et al., "Laminated Ceramic Electronic Component and Manufacturing Method Therefor", U.S. Appl. No. 12/821,305, filed Jun. 23, 2010.

(Continued)

*Primary Examiner* — Eric Thomas
(74) *Attorney, Agent, or Firm* — Keating & Bennett, LLP

(57) ABSTRACT

In a method for manufacturing a multilayer electronic component, after a plating layer for forming an external electrode is formed on an end surface of a laminate, conditions for heat-treating the laminate are set such that interdiffusion layers have ends which face internal electrodes and which are spaced from the end surface of the laminate at a distance of about 0.5 μm to about 1.9 μm.

2 Claims, 4 Drawing Sheets

OTHER PUBLICATIONS

Motoki et al.; "Multilayer Electronic Component and Method for Manufacturing the Same"; U.S. Appl. No. 12/110,484, filed Apr. 28, 2008.

Motoki et al.; "Multilayer Ceramic Electronic Component and Method for Manufacturing the Same"; U.S. Appl. No. 12/356,648, filed Jan. 21, 2009.

Iwanaga et al.; "Monolithic Ceramic Electronic Component and Method for Manufacturing the Same"; U.S. Appl. No. 12/405,370, filed Mar. 17, 2009.

Iwanaga et al.; "Multilayer Ceramic Electronic Component and Method for Producing Same"; U.S. Appl. No. 12/405,372, filed Mar. 17, 2009.

Kayatani et al.; "Multilayer Ceramic Electronic Component and Method for Making the Same"; U.S. Appl. No. 12/469,799, filed May 21, 2009.

Takeuchi et al.; "Multilayer Ceramic Electronic Component and Manufacturing Method Thereof"; U.S. Appl. No. 12/340,570, filed Dec. 19, 2008.

Kobayashi et al.; "Multilayer Ceramic Electronic Component and Method for Making the Same"; U.S. Appl. No. 12/490,471, filed Jun. 24, 2009.

Nishihara et al.; "Laminated Ceramic Electronic Component and Manufacturing Method Thereof"; U.S. Appl. No. 12/617,879, filed Nov. 13, 2009.

* cited by examiner

MULTILAYER ELECTRONIC COMPONENT AND METHOD FOR MANUFACTURING THE SAME

BACKGROUND OF THE INVENTION

1. Field of the Invention

The present invention relates to multilayer electronic components and methods for manufacturing the multilayer electronic components. The present invention particularly relates to a multilayer electronic component including a laminate and external electrodes formed on the laminate by plating and a method for manufacturing the multilayer electronic component.

2. Description of the Related Art

FIG. 4 shows a multilayer electronic component 101 exemplified by a monolithic ceramic capacitor. The multilayer electronic component 101 includes a laminate 105 including a plurality of stacked insulating layers 102 and a plurality of laminar internal electrodes 103 and 104 disposed between the insulating layers 102. End portions of the internal electrodes 103 are exposed at an end surface 106 of the laminate 105 and end portions of the internal electrodes 104 are exposed at an end surface 107 of the laminate 105. An external electrode 108 is disposed on the end surface 106 of the laminate 105 so as to electrically connect the exposed end portions of the internal electrodes 103 to each other. An external electrode 109 is disposed on the end surface 107 of the laminate 105 so as to electrically connect the exposed end portions of the internal electrodes 104 to each other.

The external electrodes 108 and 109 are formed as described below. A metal paste containing a metal component and a glass component is applied to the end surfaces 106 and 107 of the laminate 105 and is then baked, whereby paste electrodes 110 are formed. First plating layers 111 made of, for example, Ni, are provided on the paste electrodes 110. Second plating layers 112 made of, for example, Sn, are provided on the first plating layers 111. Therefore, the external electrodes 108 and 109 each have a three-layer structure including a corresponding one of the paste electrodes 110, a corresponding one of the first plating layers 111, and a corresponding one of the second plating layers 112.

The external electrodes 108 and 109 must have good wettability to solder because the multilayer electronic component 101 is soldered to a substrate. Since the internal electrodes 103 are electrically insulated from each other, the external electrode 108 must electrically connect the internal electrodes 103 to each other. Since the internal electrodes 104 are electrically insulated from each other, the external electrode 109 must electrically connect the internal electrodes 104 to each other. The second plating layers 112 have wettability to solder. The paste electrode 110 of the external electrode 108 has a function of electrically connecting the internal electrodes 103 to each other. The paste electrode 110 of the external electrode 109 has a function of electrically connecting the internal electrodes 104 to each other. The first plating layers 111 have a function of preventing solder erosion during soldering.

The paste electrodes 110 have a large thickness of several tens to several hundreds of micrometers. Therefore, in order to allow the multilayer electronic component 101 to have predetermined standard dimensions, the multilayer electronic component 101 undesirably needs to have a reduced effective volume because the volume of each paste electrode 110 is relatively large, and the capacitance of the multilayer electronic component 101 depends on the effective volume thereof. If the external electrodes 108 and 109 include only the first and second plating layers 111 and 112, the multilayer electronic component 101 can have a large effective volume because the first and second plating layers 111 and 112 have a thickness of several micrometers.

For example, Japanese Unexamined Patent Application Publication No. 63-169014 discloses a method for depositing conductive metal layers over side surfaces of a laminate by electroless plating such that internal electrodes exposed at the side surfaces thereof are short-circuited with the conductive metal layers.

The method disclosed in Japanese Unexamined Patent Application Publication No. 63-169014 has a problem in that moisture is likely to penetrate the laminate because the bonding of the conductive metal layers to the internal electrodes is insufficient.

WO 2008/059666 discloses a method of overcoming the above-described problem. In this method, plating layers to be converted into external electrodes are formed on end surfaces of a laminate and are then heat-treated at a temperature of about 600° C. or higher and an oxygen partial pressure of about 5 Pa or less, whereby interdiffusion layers are formed between the plating layers and internal electrodes. In the interdiffusion layers, the volume expansion of a metal included therein occurs. Thus, gaps that may be present between insulating layers and the internal electrodes or the external electrodes can be filled.

The interdiffusion layers extend between the internal electrodes and the plating layers. The distance from each of the ends of the interdiffusion layers that face the internal electrodes to a corresponding one of the end surfaces of the laminate is important. WO 2008/059666 describes that the ends of the interdiffusion layers that face the internal electrodes are preferably located at a location about 2 µm or more apart from a corresponding one of the end surfaces of the laminate.

When the interdiffusion layers extend to the position about 2 µm or more apart from a corresponding one of the end surfaces of the laminate, a metal component excessively transfers from the plating layers to the internal electrodes. This reduces the continuity of the plating layers. When the interdiffusion layers extend to a position about 0.4 µm or less apart from a corresponding one of the end surfaces of the laminate and are relatively short, the electrical connection between the internal electrodes and the plating layers is insufficient.

SUMMARY OF THE INVENTION

To overcome the problems described above, preferred embodiments of the present invention provide a method for manufacturing a multilayer electronic component and a multilayer electronic component manufactured by the method.

According to a preferred embodiment of the present invention, a method for manufacturing a multilayer electronic component includes a step of preparing a laminate including a plurality of stacked insulating layers and a plurality of internal electrodes which are each disposed between the insulating layers and which include end portions exposed at predetermined surfaces of the laminate and a step of forming external electrodes on the predetermined surfaces of the laminate such that the exposed end portions of the internal electrodes are electrically connected to each other.

The internal electrode-forming step preferably includes a plating sub-step of forming continuous plating layers on the predetermined surfaces of the laminate such that metal deposits are deposited on the exposed end portions of the internal electrodes and are then grown so as to be in contact with each other and also preferably includes a heat-treating sub-step of heat-treating the laminate having the plating layers. Conditions of the heat-treating sub-step are selected such that interdiffusion layers in which a metal component included in the plating layers and a metal component included in the internal electrodes are both included are formed between the internal electrodes and the plating layers. The interdiffusion layers extend between the internal electrode and the plating layers and have ends which face the internal electrodes and which are each preferably located at a position about 0.5 µm to about 1.9 µm spaced apart from a corresponding one of the predetermined surfaces of the laminate, for example.

According to another preferred embodiment of the present invention, a multilayer electronic component includes a laminate including a plurality of stacked insulating layers and a plurality of internal electrodes which are each disposed between the insulating layers and which include end portions exposed at predetermined surfaces of the laminate and also includes external electrodes disposed on the predetermined surfaces of the laminate. The external electrodes include plating layers which are disposed on the predetermined surfaces of the laminate so as to electrically connect the exposed end portions of the internal electrodes. The internal electrodes and the plating layers sandwich interdiffusion layers in which a metal component included in the plating layers and a metal component included in the internal electrodes are both included. The interdiffusion layers extend between the internal electrode and the plating layers and have ends which face the internal electrodes and which are each located at a position about 0.5 µm to about 1.9 µm spaced apart from a corresponding one of the predetermined surfaces of the laminate, for example.

According to another preferred embodiment of the present invention, plating layers for forming internal electrodes are preferably formed and then heat-treated under specific conditions. Therefore, interdiffusion occurs in boundary regions between the plating layers and internal electrodes to cause the volume expansion of the boundary regions. This fills gaps that may be present between the internal electrodes and insulating layers and gaps that may be present between the insulating layers and the plating layers to enable a laminate to be sealed. Therefore, moisture, a plating solution, and other contaminants are prevented from penetrating the laminate. Thus, properties of the laminate are prevented from being deteriorated as determined by a load test under high-temperature, high-humidity conditions.

According to another preferred embodiment of the present invention, interdiffusion layers formed by heat treatment have ends which face internal electrodes and which are each preferably located at a position about 0.5 µm to about 1.9 µm spaced apart from a predetermined surface of a laminate, for example. Therefore, the continuity of the plating layers is maintained and the electrical connection between the plating layers the internal electrode is maintained as well.

These and other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

A multilayer electronic component 1 according to a first preferred embodiment of the present invention and a method for manufacturing the multilayer electronic component 1 will now be described with reference to FIGS. 1 and 2.

Figure 1:
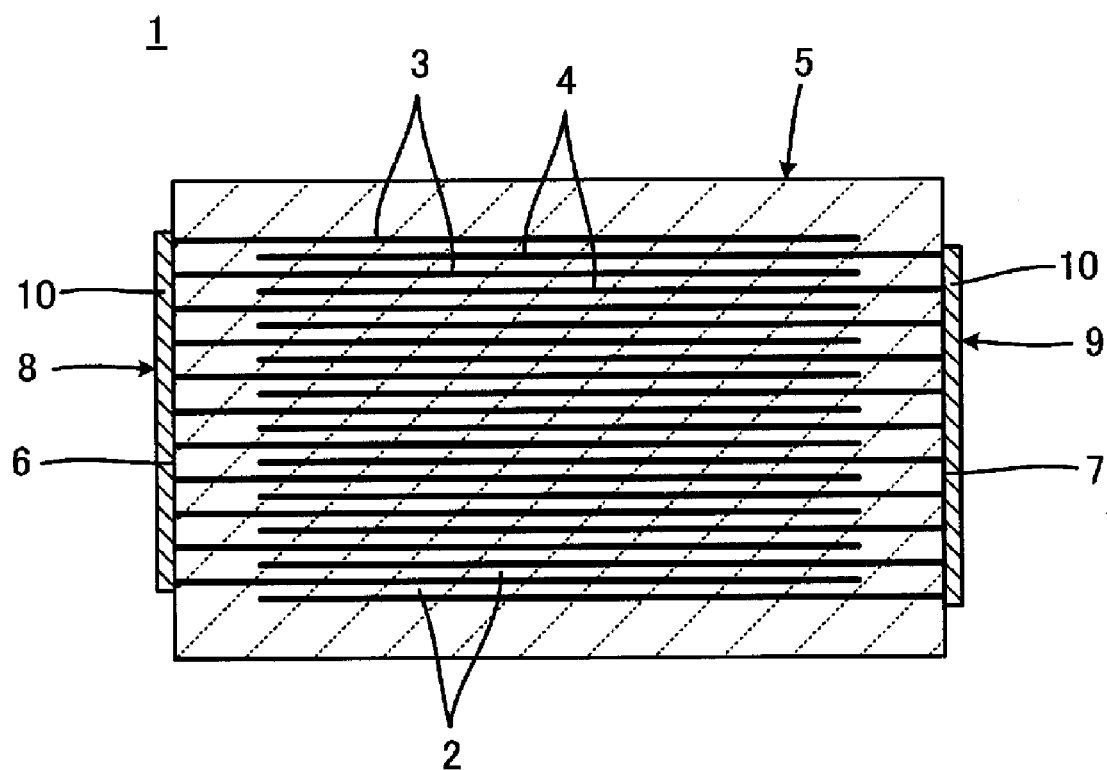
FIG. 1 is a sectional view of a multilayer electronic component according to a first preferred embodiment of the present invention.

With reference to FIG. 1, the multilayer electronic component 1 includes a laminate 5 including a plurality of stacked insulating layers 2, a plurality of laminar first internal electrodes 3, and a plurality of laminar second internal electrodes 4. The first and second internal electrodes 3 and 4 are disposed between the insulating layers 2. When the multilayer electronic component 1 is a monolithic ceramic capacitor, the insulating layers 2 are preferably made of a dielectric ceramic. The laminate 5 has a first end surface 6 and a second end surface 7. Each of the first internal electrodes 3 includes an end portion exposed at the first end surface 6 of the laminate 5. Each of the second internal electrodes 4 includes an end portion exposed at the second end surface 7 of the laminate 5. The multilayer electronic component 1 further includes a first external electrode 8 and a second external electrode 9. The first external electrode 8 electrically connects the exposed end portions of the first internal electrodes 3. The second external electrode 9 electrically connects the exposed end portions of the second internal electrodes 4.

Each of the first and second external electrodes 8 and 9 includes a plating layer 10 preferably made from metal deposits formed by a wet plating process, such as an electroplating process or an electroless plating process. That is, the first and second external electrodes 8 and 9 include no conductive paste film, vapor-deposited film, or sputtered film.

The method for manufacturing the multilayer electronic component 1 is described below with particular emphasis on the first and second external electrodes 8 and 9 with reference to FIGS. 1 and 2. FIG. 2 is an enlarged view of a portion of the laminate 5 shown in FIG. 1, that is, a portion of the first end surface 6, at which the first internal electrodes 3 are partially exposed. The second end surface 7 and the second internal electrodes 4 are substantially the same as the first end surface 6 and the first internal electrodes 3, respectively.

The laminate 5, which includes the insulating layers 2, the first internal electrodes 3, and the second internal electrodes 4, is prepared. If the first internal electrodes 3 and the second internal electrodes 4 are spaced apart from the first end surface 6 and the second end surface 7, respectively, and therefore are not sufficiently exposed, the insulating layers are preferably ground by a process such as sand blasting or barreling such that the first internal electrodes 3 and the second internal electrodes 4 are sufficiently exposed at the first end surface 6 and the second end surface 7, respectively.

The first external electrode 8 and the second external electrode 9 are formed on the first end surface 6 and second end surface 7, respectively, of the laminate 5 such that the first internal electrodes 3 are electrically connected to each other and the second internal electrodes 4 are electrically connected to each other.

In the step of forming the first and second external electrodes 8 and 9, a plating process is performed such that the metal deposits are deposited on the exposed end portions of the first and second internal electrodes 3 and 4 and are then grown so as to be in contact with each other and the plating layers 10 are thereby formed on the first and second end surfaces 6 and 7 so as to be continuous. Examples of the plating process include electroplating and electroless plating. In the case where electroless plating is used and the first and second internal electrodes 3 and 4 have no catalytic activity, the first and second internal electrodes 3 and 4 are treated in advance so as to have catalytic activity.

The laminate 5 having the plating layers 10 formed thereon as described above is heat-treated preferably at a temperature of about 600° C. or higher in, for example, a non-oxidizing atmosphere with an oxygen partial pressure of about 5 Pa or less. The heat treatment of the laminate 5 causes the interdiffusion of a metal component included in the first and second internal electrodes 3 and 4 and a metal component included in the plating layers 10, which are used to form the first and second external electrodes 8 and 9. Therefore, interdiffusion layers 11 are formed between the first and second internal electrodes 3 and 4 and the plating layers 10 as shown in FIG. 2. The interdiffusion of the metal components causes a volume expansion of boundary regions between the first and second internal electrodes 3 and 4 and the plating layers 10, thereby filling gaps that may be present between the insulating layers 2 and the first and second internal electrodes 3 and 4 and gaps that may be present between the insulating layers 2 and the plating layers 10. This prevents moisture, a plating solution, and other contaminants from penetrating the laminate 5. Thus, properties of the laminate 5 can be prevented from being deteriorated as determined by a load test under high-temperature, high-humidity conditions.

The interdiffusion layers 11 needs to meet a requirement that the metal component contained in the plating layers 10 and the metal component contained in the first and second internal electrodes 3 and 4 are both detected. In other words, the interdiffusion layers 11 are defined as regions meeting the requirement.

Figure 2:
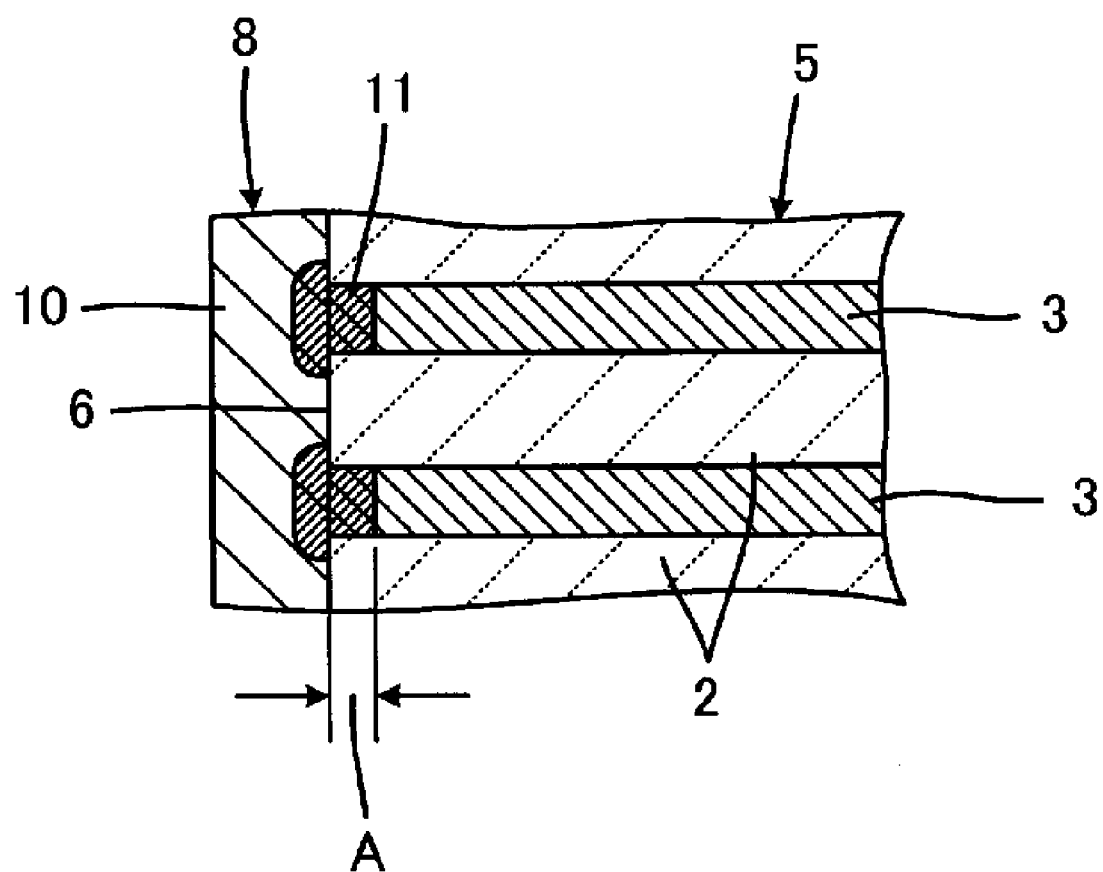
FIG. 2 is an enlarged sectional view of a portion of a laminate disposed in the multilayer electronic component shown in FIG. 1.

The interdiffusion layers 11 are formed so as to extend between the plating layers 10 and the first and second internal electrodes 3 and 4 as shown in FIG. 2. The formation of the interdiffusion layers 11 improves the electrical connection between the plating layers 10 and the first and second internal electrodes 3 and 4. In order to ensure the electrical connection therebetween, ends of the interdiffusion layers 11 that face the first or second internal electrodes 3 or 4 only need to be located at a position about 0.5 μm or more spaced apart from the first or second end surface 6 or 7, respectively, and is confirmed from the experiments described below. The distance from each of the ends of the interdiffusion layers 11 that face the first or second internal electrodes 3 or 4 to the first or second end surface 6 or 7, respectively, is represented by A as shown in FIG. 2 and is hereinafter referred to as the distance A.

In order to achieve a sufficient sealing effect by the formation of the interdiffusion layers 11, the interdiffusion layers 11 need to be formed in regions with a predetermined size or greater. Since portions of the interdiffusion layers 11 that are close to the first or second internal electrodes 3 or 4 are formed by the migration of the metal component included in the plating layers 10 to the first or second internal electrodes 3 or 4, respectively, an increase in the distance A is likely to cause defects in the plating layers 10 and therefore, the continuity of the plating layers 10 is likely to be deteriorated. In order to secure the continuity of the plating layers 10, the distance A only needs to be about 1.9 μm or less, for example, as is clear from the experiments below.

In order to control the distance A within a range from about 0.5 μm to about 1.9 μmm, for example, during the formation of the interdiffusion layers 11, at least one of the heat-treating temperature and time of the laminate 5 is usually adjusted. Therefore, heat treatment is performed under various conditions including different temperatures and times in advance of large-scale production, whereby the heat-treating temperature and time of the laminate 5 is determined such that the distance A ranges from about 0.5 μm to about 1.9 μm. In large-scale production, a heat-treating step is performed under such conditions.

In order to readily produce interdiffusion by heat treatment, a major metal component of the first and second internal electrodes 3 and 4 is preferably different from a major metal component of the plating layers 10.

Examples of the major metal component of the first and second internal electrodes 3 and 4 include Ni, Cu, Pd, and Ag. When the major metal component of the first and second internal electrodes 3 and 4 is Ni, the major metal component of the plating layers 10 is preferably at least one selected from the group consisting of Ag, Au, Co, Cr, Cu, Fe, Sn, Pt, and Pd. When the major metal component of the first and second internal electrodes 3 and 4 is Cu, the major metal component of the plating layers 10 is preferably at least one selected from the group consisting of Ag, Au, Co, Cr, Fe, In, Ir, Ni, Pd, Pt, Rh, Sn, and Zn. When the major metal component of the first and second internal electrodes 3 and 4 is Pd, the major metal component of the plating layers 10 is preferably at least one selected from the group consisting of Cu, Fe, Ni, Rh, and Sn. When the major metal component of the first and second internal electrodes 3 and 4 is Ag, the major metal component of the plating layers 10 is preferably at least one selected from the group consisting of Au, Co, Cu, Fe, In, Ni, Pd, Sn, and Zn.

The major metal component of the plating layers 10 is more preferably Cu or Ni when the major metal component of the first and second internal electrodes 3 and 4 is Ni or Cu, respectively, or when the major metal component of the first and second internal electrodes 3 and 4 is Pd or Ag, respectively.

The presence of the interdiffusion layers 11, which is shown in FIG. 2, can be confirmed by mapping analysis using a wavelength dispersive X-ray microanalyzer (WDX). That is, the two-dimensional diffusion of the metal components can be confirmed by WDX mapping analysis.

In the multilayer electronic component 1, the first and second external electrodes 8 and 9 each include a corresponding one of the plating layers 10. The first and second external electrodes 8 and 9 may further include at least one plating layer.

Second Preferred Embodiment

Figure 3:
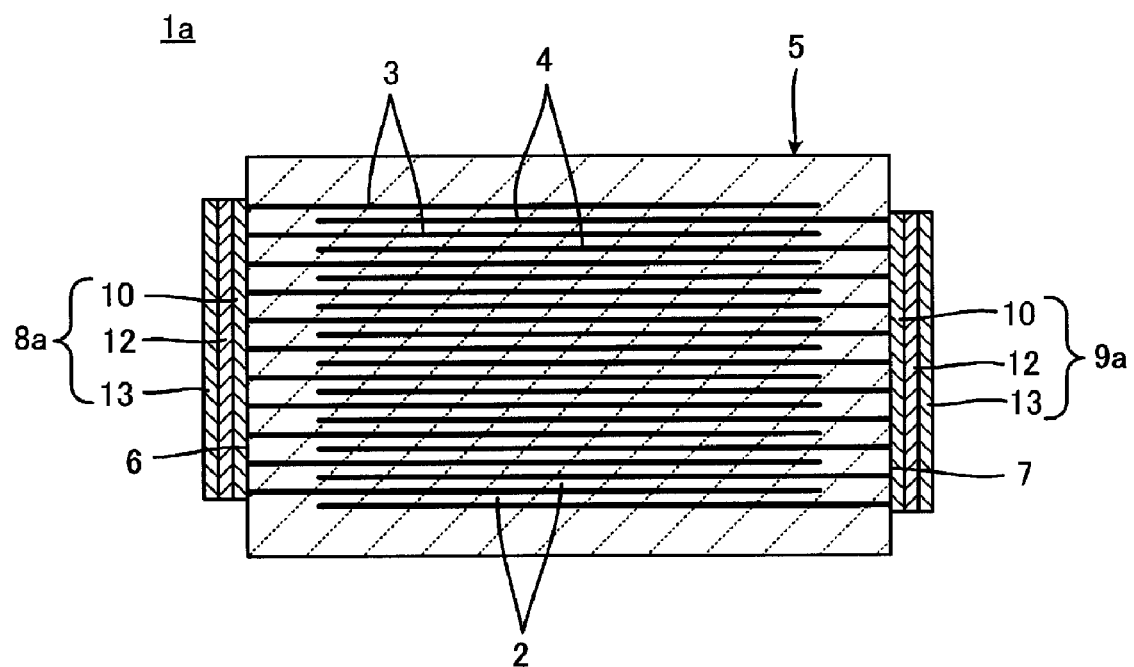
FIG. 3 is a sectional view of a multilayer electronic component according to a second preferred embodiment of the present invention.
Figure 4:
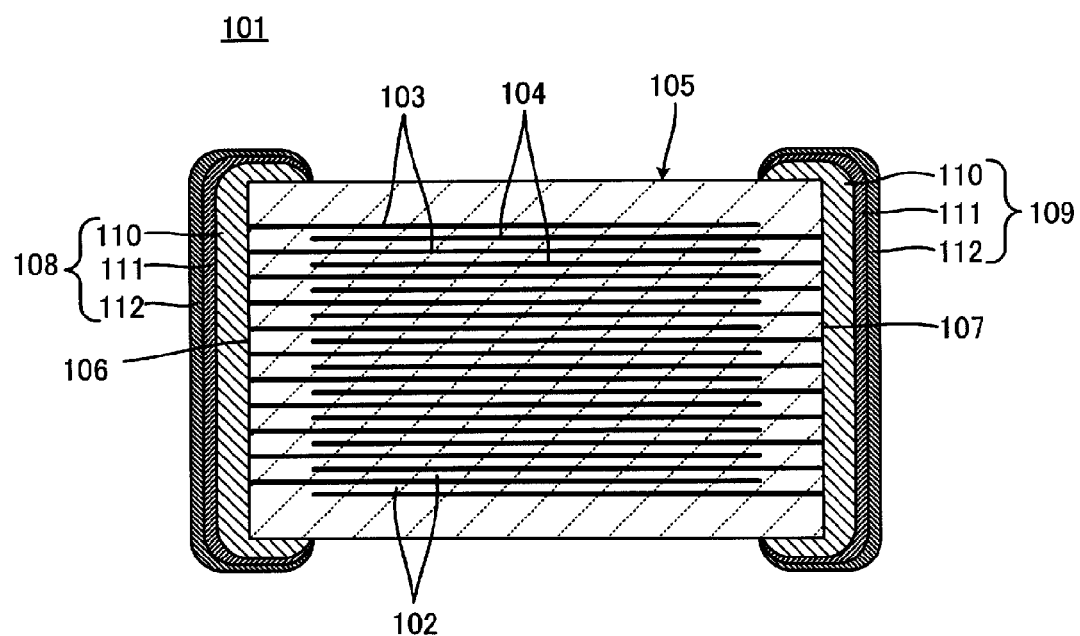
FIG. 4 is a sectional view of a conventional multilayer electronic component.

FIG. 3 shows a multilayer electronic component 1a according to a second preferred embodiment of the present invention and corresponds to FIG. 1. In FIG. 3, the same elements as those shown in FIG. 1 are denoted by the same reference numerals as those used in FIG. 1 and will not be described in detail.

With reference to FIG. 3, the multilayer electronic component 1a includes a laminate 5 having a first end surface 6 and a second end surface 7, a first external electrode 8a, and a second external electrode 9a. Each of the first and second external electrodes 8a and 9a includes a base plating layer 10, an intermediate plating layer 12 corresponding to a second plating layer, and an outer plating layer 13 arranged in that order. The base plating layer 10 of the first external electrode 8a and the base plating layer 10 of the second external electrode 9a are disposed on the first end surface 6 and the second end surface 7, respectively. The base, intermediate, and outer plating layers 10, 12, and 13 can preferably be formed by electroplating or electroless plating in substantially the same manner as that used to form the plating layers 10 described in the first preferred embodiment.

The outer plating layers 13 preferably have good wettability to solder and therefore are preferably made of, for example, Sn or Au. In this preferred embodiment, the base plating layers 10 are preferably made of, for example, Cu. In this case, the intermediate plating layers 12 are preferably made of, for example, Ni, because the intermediate plating layers 12 preferably have a function of preventing solder erosion during soldering. The base plating layers 10 may be made of, for example, Ni. In this case, the first and second external electrodes 8a and 9a may include none of the intermediate plating layers 12.

The first and second external electrodes 8a and 9a include the base, intermediate, and outer plating layers 10, 12, and 13 as shown in FIG. 3. The plating layers 10 are targets for causing the above-mentioned interdiffusion. The laminate 5 may be heat-treated for the purpose of causing the above-mentioned interdiffusion at any time after the base plating layers 10 are formed. The laminate 5 is preferably heat-treated before the intermediate plating layers 12 and/or the outer plating layers 13 are formed. This is because plating solutions used to form the intermediate plating layers 12 or the outer plating layers 13 can be prevented from penetrating the laminate 5.

The present invention is described above with reference to the illustrated preferred embodiments. Various modifications may be made within the scope of the present invention.

Examples of a multilayer electronic component according to preferred embodiments of the present invention include multilayer chip capacitors, multilayer chip inductors, and multilayer chip thermistors.

Therefore, insulating layers included in the multilayer electronic component only need to be electrically insulating. A material for forming the insulating layers is not particularly limited. The insulating layers may be made of a dielectric ceramic, a piezoelectric ceramic, a semiconductor ceramic, or a magnetic ceramic.

Experiments that were performed to determine the scope of the present invention and performed to confirm advantages of the present invention are described below.

The following laminates were prepared: laminates for use in multilayer electronic components having a rated voltage of about 6.3 V, a capacitance of about 10 µF, a length of about 2.0 mm, a width of about 1.25 mm, and a height of about 1.25 mm. The multilayer electronic components were monolithic ceramic capacitors. The laminates were used as samples as described below. Each of the laminates included insulating layers made of a barium titanate-based dielectric ceramic and internal electrodes made of Ni. The number of insulating layers included in each laminate was 416. The insulating layers had a thickness of about 1.9 µm.

The laminates were placed in a horizontal rotary barrel together with conductive media having a diameter of about 1.8 mm. The horizontal rotary barrel was immersed in a strike bath, having a pH of about 8.5 and a temperature of about 25° C., for Cu plating. Electroplating was performed at a current density of about 0.11 A/dm$^2$ for about 60 minutes while the horizontal rotary barrel was being rotated at about 10 rpm, whereby Cu strikes were formed on end surfaces of the laminates at which the internal electrodes were exposed. The strike bath contained about 14 g/L of copper pyrophosphate, about 120 g/L of pyrophosphoric acid, and about 10 g/L of potassium oxalate.

The horizontal rotary barrel containing the laminates having the Cu strikes was immersed in a Cu electroplating bath (Pyrobright process, manufactured by C. Uyemura & Co., Ltd.) having a pH of about 8.8 and a temperature of about 55° C. Electroplating was performed at a current density of about 0.30 A/dm$^2$ for about 60 minutes while the horizontal rotary barrel was being rotated at about 10 rpm, whereby an electroformed Cu layer was deposited on each Cu strike. The electroformed Cu layer and the Cu strike formed a Cu coating with a thickness of about 10 µm.

The laminates having the Cu plating were heat-treated at about 600° C. for about 20 to 120 minutes in nitrogen atmospheres having an oxygen partial pressure of less than about 5 Pa as shown in the column "Heat-Treating Conditions" in Table 1.

The resulting laminates were put into the horizontal rotary barrel together with conductive media having a diameter of about 1.8 mm. The horizontal rotary barrel was immersed in a Watt bath (mildly acidic simple Ni bath), having a pH of about 4.2 and a temperature of about 60° C., for Ni plating. Electroplating was performed at a current density of about 0.20 A/dm$^2$ for about 60 minutes while the horizontal rotary barrel was being rotated at about 10 rpm, whereby a Ni plating with a thickness of about 4 µm was deposited on each Cu plating.

The horizontal rotary barrel containing the laminates having the Ni platings was immersed in a Sn plating bath (Sn-235, manufactured by Dipsol Chemicals Co., Ltd.) having a pH of about 5.0 and a temperature of about 33° C. Electroplating was performed at a current density of about 0.10 A/dm$^2$ for about 60 minutes while the horizontal rotary barrel was being rotated at about 10 rpm, whereby a Sn plating with a thickness of about 4 µm was deposited on each Ni plating.

The multilayer electronic components were obtained as described above. The multilayer electronic components included electrolytic platings, that is, the Ni platings and the Sn platings. Evaluations were performed in the course of preparing the multilayer electronic components as described below.

In a first evaluation, in order to assess the interdiffusion between the internal electrodes and the Cu platings, the heat-treated laminates having no Ni platings were subjected to WDX mapping analysis, whereby the two-dimensional interdiffusion of metal elements were analyzed. In the analysis, a scanning electron microscope (SEM), JXA 8500F, available from JOEL Ltd., was used under the following conditions: an accelerating voltage of about 15 kV, a probe current of about 50 nA, a magnification of about 5,000 times, and a dwell time of 40 ms. A primary ray such as a Kα characteristic X-ray was used to detect Ni and Cu. The interdiffusion determined as described above is shown in the column "Diffusion distance" in Table 1. "Diffusion distance" corresponds to the "distance A" in FIG. 2.

In a second evaluation, in order to evaluate the Cu platings for continuity, the laminates having the Ni platings were subjected to WDX mapping analysis, whereby the Ni platings were analyzed for coverage. The coverage of each Ni plating was determined from the following equation:

$$\text{Coverage} = (\text{Area of Ni plating})/(\text{Area of end surface of laminate}).$$

Results obtained from ten of the laminates were averaged. Obtained averages are shown in the column "Average coverage" in Table 1.

In a third evaluation, the Cu platings were evaluated for electrical connection as described below. Each heat-treated laminate having no Ni platings was measured for capacitance. After the multilayer electronic component was charged in such a manner that a voltage of about 40 V was applied between the Cu platings for about five seconds, the multilayer electronic component was discharged such that the Cu platings were short-circuited by connecting the Cu platings to a no-load line. After this procedure was repeated five times, the multilayer electronic component was measured for capacitance. If the capacitance of the charged and discharged laminate was about 1% or more less than the initial capacitance of the laminate, the laminate was judged to be defective. Ten of the laminates were determined for defect rate. Obtained results are shown in the column "Defect rate determined by charge/discharge test" in Table 1.

The laminates were categorized into Samples 1 to 8 as shown in Table 1.

TABLE 1

| Samples | Heat-treating conditions | Diffusion distance | Average coverage | Defect rate determined by charge/ discharge test |
|---|---|---|---|---|
| 1 | 600° C. for 20 minutes | 0.1 μm | 100% | 30% |
| 2 | 600° C. for 40 minutes | 0.4 μm | 100% | 10% |
| 3 | 600° C. for 45 minutes | 0.5 μm | 100% | 0% |
| 4 | 600° C. for 60 minutes | 0.7 μm | 100% | 0% |
| 5 | 600° C. for 80 minutes | 1.1 μm | 100% | 0% |
| 6 | 600° C. for 100 minutes | 1.5 μm | 100% | 0% |
| 7 | 600° C. for 115 minutes | 1.9 μm | 100% | 0% |
| 8 | 600° C. for 120 minutes | 2.0 μm | 99.2% | 0% |

As is clear from Table 1, when "Diffusion distance" is within a range from about 0.5 μm to about 1.9 μm, "Average coverage" is 100% and "Defect rate determined by charge/discharge test" is 0%, that is, the Cu platings are maintained in continuity and are good in electrical connection.

While preferred embodiments of the present invention have been described above, it is to be understood that variations and modifications will be apparent to those skilled in the art without departing from the scope and spirit of the present invention. The scope of the invention, therefore, is to be determined solely by the following claims.

What is claimed is:

1. A method for manufacturing a multilayer electronic component, comprising:
a step of preparing a laminate including a plurality of stacked insulating layers and a plurality of internal electrodes which are each disposed between the insulating layers and which include end portions exposed at predetermined surfaces of the laminate; and
a step of forming external electrodes on the predetermined surfaces of the laminate such that the exposed end portions of the internal electrodes are electrically connected to each other; wherein
the external electrode-forming step includes a plating sub-step of forming continuous plating layers on the predetermined surfaces of the laminate such that metal deposits are deposited on the exposed end portions of the internal electrodes and are then grown so as to be in contact with each other and a heat-treating sub-step of heat-treating the laminate having the plating layers, conditions of the heat-treating sub-step are selected such that interdiffusion layers in which a metal component included in the plating layers and a metal component included in the internal electrodes are both included are formed between the internal electrodes and the plating layers, and the interdiffusion layers extend between the internal electrode and the plating layers and have ends which face the internal electrodes and which are each located at a position about 0.5 μm to about 1.9 μm spaced apart from a corresponding one of the predetermined surfaces of the laminate.

2. A multilayer electronic component comprising:
a laminate including a plurality of stacked insulating layers and a plurality of internal electrodes which are each disposed between the insulating layers and which include end portions exposed at predetermined surfaces of the laminate; and
external electrodes disposed on the predetermined surfaces of the laminate; wherein
the external electrodes include plating layers which are disposed on the predetermined surfaces of the laminate so as to electrically connect the exposed end portions of the internal electrodes, the internal electrodes and the plating layers sandwich interdiffusion layers in which a metal component included in the plating layers and a metal component included in the internal electrodes are both included, and the interdiffusion layers extend between the internal electrode and the plating layers and have ends which face the internal electrodes and which are each located at a position about 0.5 μm to about 1.9 μm spaced apart from a corresponding one of the predetermined surfaces of the laminate.

* * * * *